(12) United States Patent
Schmidt et al.

(10) Patent No.: US 7,080,911 B2
(45) Date of Patent: Jul. 25, 2006

(54) COMBINATION MIRROR MOUNT AND HEADLIGHT VISOR FOR CROSS VIEW OR SPOT MIRROR

(75) Inventors: William Paul Schmidt, Newport, MI (US); Jack N. Perry, II, Ida, MI (US)

(73) Assignee: Ideal Molded Lite Components, Inc., Rockwood, MI (US)

( * ) Notice: Subject to any disclaimer, the term of this patent is extended or adjusted under 35 U.S.C. 154(b) by 52 days.

(21) Appl. No.: 10/895,529

(22) Filed: Jul. 21, 2004

(65) Prior Publication Data

US 2006/0018023 A1   Jan. 26, 2006

(51) Int. Cl.
G02B 17/00 (2006.01)
G02B 5/08 (2006.01)
(52) U.S. Cl. ............................ 359/602; 359/871
(58) Field of Classification Search .......... 359/601, 359/602, 609, 611; 362/478–479, 344, 358–359, 362/507, 516
See application file for complete search history.

(56) References Cited

U.S. PATENT DOCUMENTS

| 2,649,839 A | * | 8/1953 | Condon .................... 359/507 |
| 5,084,785 A | * | 1/1992 | Albers et al. ............... 359/868 |
| 2002/0089753 A1 | * | 7/2002 | Englander ................. 359/603 |

* cited by examiner

Primary Examiner—Mark A. Robinson
Assistant Examiner—Scott Stephens
(74) Attorney, Agent, or Firm—Steven W. Hays; Artz & Artz

(57) ABSTRACT

A combination mirror mount and headlight glare visor that reduces headlight glare to the driver without changing the mirror height or mounting locations. The combination mirror mount and headlight glare visor maintains the field of vision requirements of FMVSS 111 for school buses and maintains the conventional mounting aspects of previous designs. The shape of the headlight visor portion is designed to substantially cover the headlight as viewed through the cross view mirror during operation of the vehicle.

27 Claims, 4 Drawing Sheets

COMBINATION MIRROR MOUNT AND HEADLIGHT VISOR FOR CROSS VIEW OR SPOT MIRROR

TECHNICAL FIELD AND INDUSTRIAL APPLICABILITY OF THE INVENTION

The present invention relates generally to a mirror assembly and more particularly to a combination mirror mount and headlight visor for a cross view or spot mirror.

BACKGROUND OF THE INVENTION

Mirrors have been known to man for many centuries. The mirrors made by the ancient Greeks and Romans were mostly made from polished bronze, but glass mirrors were also known. During the middle ages, a process for backing glass with a thin layer of silver and steel was developed.

Today, mirrors are used in a variety of wide ranging applications such as astronomy, space ships, solar devices, vehicles, microscopes, satellite communication devices and medicine. One of the best-known applications for mirrors consists of their use on motor vehicles.

Motor vehicles require mirrors in order to provide the driver or operator of the vehicle with a field of view behind and beside the vehicle. This is done for safety purposes since most vehicles, due to structural obstructions, have "blind spots" which prevent the driver from seeing any object that may come near the front, rear or sides of the vehicle. For years, the automobile designers have attempted to eliminate these blind spots when designing vehicles. Unfortunately, this objective can never be achieved because of the design of the motor vehicle. Thus, it has been found necessary to mount mirrors in and around the vehicle to enhance the field of view of the driver.

Many of the aforementioned prior art mirrors have had success in reducing "blind spots" in front of large vehicles, such as school buses. The National Safety Council has reported that 58,000 annual school bus accidents occurred nationally in 1977 and 1978 with approximately 165 fatalities per year. A Kansas Department of Transportation study of these national school bus fatalities pinpoints the contributing factors. From 1975 through 1978, 73 percent of the fatalities were among homeward bound pupils; 60 percent of the pupils were killed by the bus itself; and 47 percent were 5 and 6 years old. These statistics indicate that enhancing the driver's view in front of and around the vehicle could reduce these fatalities.

One mirror that has been designed to reduce blind spots in front of a vehicle such as a bus is a cross view mirror. Cross view mirrors have been designed and mounted to the front corners of the bus to provide the driver with visual access to the areas in front and sides of the bus that are hidden from direct view. Currently available cross view mirrors are required to see a particular forward, rightward and leftward visual orientation in front of school buses as mandated by FMVSS (Federal Motor Vehicle Safety Standard) 111. Under FMVSS 111, the school bus builder certifies mirror compliance using the eye ellipses of a $25^{th}$ percentile women driver when the school bus is sold.

When cross view mirrors were first introduced to the school bus industry, the front end of the bus was basically flat and had headlights that were on the same plane as the front grill. Recently, in an effort to improve aerodynamics, the headlights have been moved aft of the front grill and wrapped over the top of the fender. These changes sometimes create headlight glare in the driver's eyes reflecting from the mirrored surface of cross view mirrors.

Attempts to combat headlight glare have focused on adjustments to the mirror height at the intersection point that comply with FMVSS 111. However, increasing the mirror height often makes for more difficult bracing, potential increases in vibration, and additional stresses on the vehicle hood at mounting points. This additional mirror height moves the blind spot in the driver's natural, forward line of site. Finally, the additional mirror height likely does not solve the headlight glare problem and is not aesthetically pleasing.

SUMMARY OF THE INVENTION

The present invention addresses the headlight glare issue by a combination mirror mount and headlight glare visor that reduces headlight glare to the driver without changing the mirror height or mounting locations. The combination mirror mount and headlight glare visor maintains the field of vision requirements of FMVSS 111 for school buses and maintains the conventional mounting aspects of previous designs. The combination mirror mount and headlight visor may be used on trucks.

The shape of the headlight visor portion is designed to substantially cover the headlight as viewed through the cross view mirror or spot mirror during operation of the school bus or truck. Thus, the shape of the headlight visor portion may vary depending upon numerous factors, including but not limited to the shape and manufacturer of the headlight and to the distance between the visor portion and the headlamp in conjunction with the viewing angle through the mirror reflective surface as seen by the vehicle operator.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
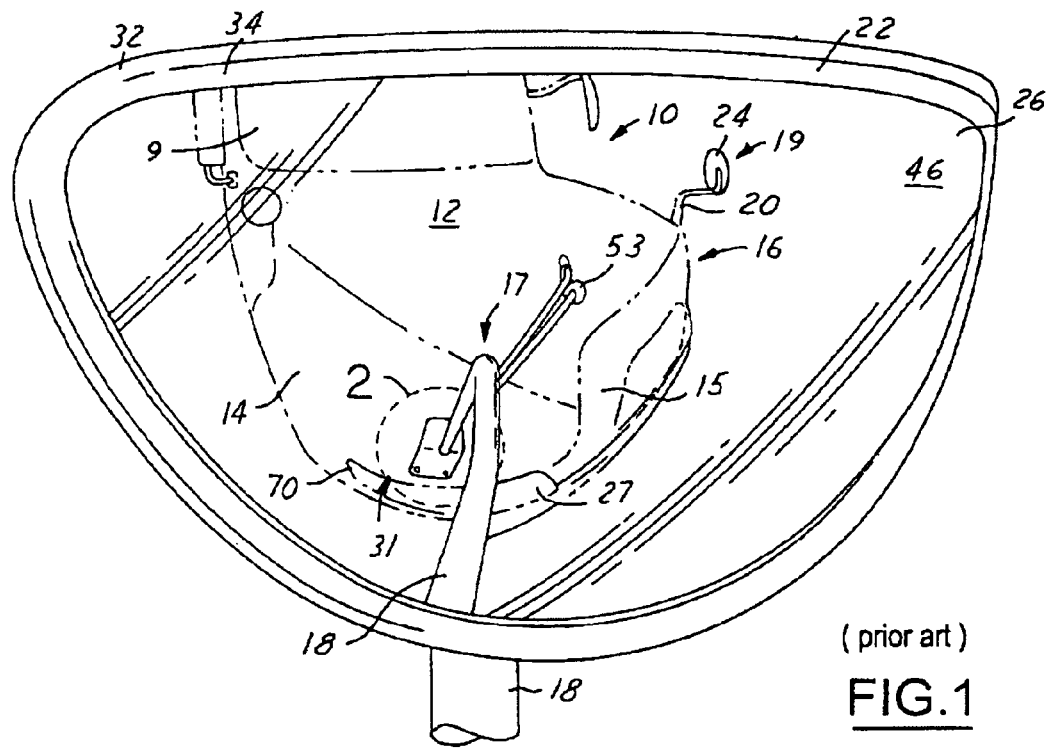
FIG. 1 is a perspective view a cross view mirror subassembly in which a conventional mounting arrangement of the cross view mirror assembly is visible to a vehicle operator through a reflective surface of the cross view mirror.
Figure 2:
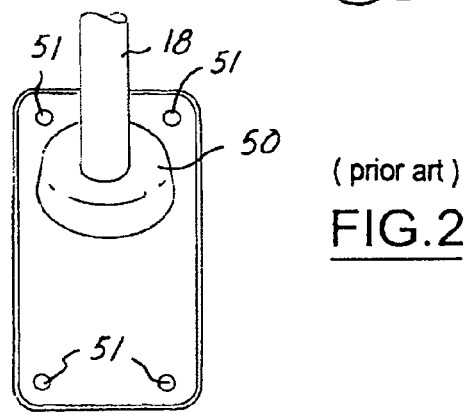
FIG. 2 is a close-up view of a portion of FIG. 1.
Figure 3:
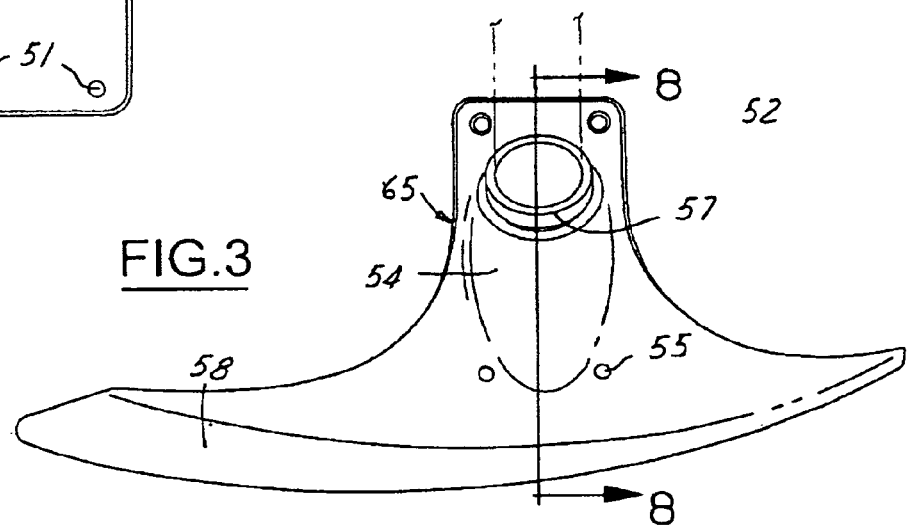
FIG. 3 is a perspective view of a combination mirror mount and headlight visor according to one preferred embodiment of the present invention.

Referring to FIGS. 1 and 2, a motor vehicle 10, here shown as a school bus 10, has a hood 12 and front fenders 14 and 16. A front grill 15 extends forward from the hood 12 and is coupled to each of the fenders 14, 16. Headlights 27, here shown as a pair of headlights 27, are coupled within the front grill 15 and are wrapped over the top of the respective fenders 14, 16. School bus headlights 27 are typically illuminated during vehicle operation.

The hood 12 and fenders 14, 16 often cause a large area in front of the school bus to be hidden from direct view of the driver sitting in the cab area 9, particularly in view of its height from the ground. Heretofore, children have been injured when standing in this area as the bus moves forwardly.

To allow for the operator to see in front of and to the side of the bus, a pair of cross view mirror assemblies 17, 19 are individually coupled to the hood 12 and respective fenders 14, 16. The cross view mirror assemblies 17, 19 each have elongated, arcuate cross view mirror subassemblies 22 and 24 that are coupled to a respective support 18 and 20 and positioned so that the driver can see the hidden area in front of the school bus 10 and the areas alongside the school bus 10 clearly and with minimum distortion from the cab 15 during bus operation.

Each mirror subassembly 22, 24 includes an elongate, arcuate mirror 26 that has a reflective surface 46 with a generally convex shape throughout. The mirror 26 is mounted in a frame having a curved back plate and turned in edges 32. The edges 32 are turned over the edges of the mirror 26 with a suitable vinyl or rubber layer 34 there between. Preferably, the mirror assemblies 22, 24 are mounted such that the "blind spot" behind each mirror 26 mounted to one fender 14 is fully disclosed in the other mirror 26 mounted to the opposite fender 16.

As best shown in FIG. 2, each support 18, 20 is coupled to a mounting portion 50 that in turn is mounted to the respective fender 14, 16 at a position near and above the respective headlight 27. The mounting portion 50 is shaped along its bottom surface to conform to the fender 14, 16. The mounting portion 50 utilizes a plurality of mounting holes 51 (in conjunction with bolts or other conventional mounting devices) through which the cross view mirror 17, 19 is secured to the respective fender 14, 16. A second mounting portion 53 is coupled to a separate portion of the support 18, 20 and is coupled to the hood 12 of the school bus in a similar arrangement.

The cross view mirror assemblies 17, 19 are thus mounted to the vehicle 10 so that the vehicle operator can see a particular forward, rightward and leftward visual orientation in front of school bus 10 as mandated by FMVSS (Federal Motor Vehicle Safety Standard) 111. Under FMVSS 111, the school bus builder certifies mirror compliance using the eye ellipses of a $25^{th}$ percentile women driver when the school bus 10 is sold. Each mirror assembly 17, 19 may have a fixed up and down visual orientation (along the y-axis or vertical adjustment). Rightward or leftward (corresponding to a counterclockwise or clockwise adjustment, (i.e., horizontal adjustment) of the mirror assembly) is performed by the vehicle operator either manually or electronically. Typically, cross view mirror 19 is similar to cross view mirror 17.

As best shown in FIG. 1, the headlights 27, and more specifically the glare from the headlights 27 illuminated during vehicle operation, are visible to the vehicle operator through the reflective surface 46 of the arcuate mirror 26.

To prevent headlight glare from reaching the vehicle operator, as shown in FIGS. 3–6, a combination mirror mount and headlight visor 52 replaces the conventional mounting portion 50. The combination mirror mount and headlight visor 52 aids in preventing or minimizing headlight glare to the vehicle operator through the reflective surface 46 without adversely affecting the function of the headlights in illuminating the area in front of the bus during operation and without significantly increasing costs associated with the production of and mounting of the cross view mirrors 17, 19 to the respective fender 14, 16.

The combination mirror mount and headlight visor 52 may be formed from conventional mounting materials such as metal and plastic in any number of conventional methods. For example, the combination mirror mount and headlight visor 52 may be formed utilizing a conventional injection molding process. The combination mirror mount and headlight visor may also be formed of composite materials such as fiber-reinforced plastics.

In one preferred embodiment, as shown in FIGS. 3–6, the combination mirror mount and headlight visor 52 includes a central mounting region 54 having a bottom region 65 that is shaped to conform to the surface of the respective fender 14, 16. The central mounting region 54 may have one or more mounting holes 55 used to couple the combination mirror mount and headlight visor 52 to the surface of the fender 14, 16 via conventional coupling devices such as bolts, screws, or rivets. In addition, the central mounting region 54 has a support mount region 57 that couples to and supports the respective support 18, 20.

Figure 4:
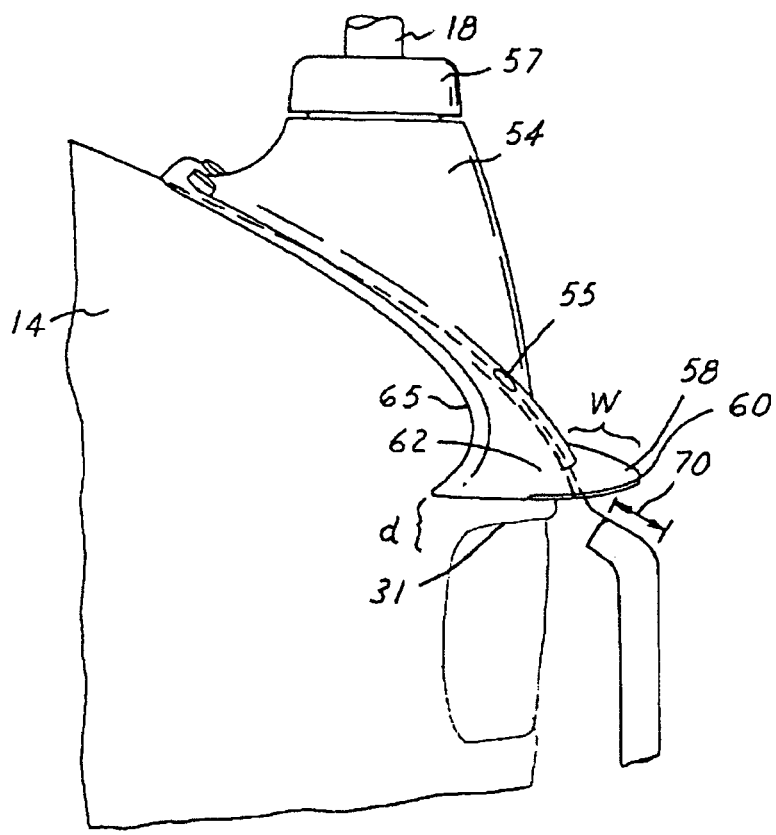
FIG. 4 is the combination mirror mount and headlight visor of FIG. 3 coupled to a school bus.

As best shown in FIG. 4, the combination mirror mount and headlight visor 52 also has a flared outer region 58, otherwise known as the visor portion 58, extending from the central mounting region 54 outwardly from the surface of the fender 14, 16. The visor portion 58 is shaped similarly to the portion 28 of the headlight extending over the top of the fender 14, 16.

Figure 5:
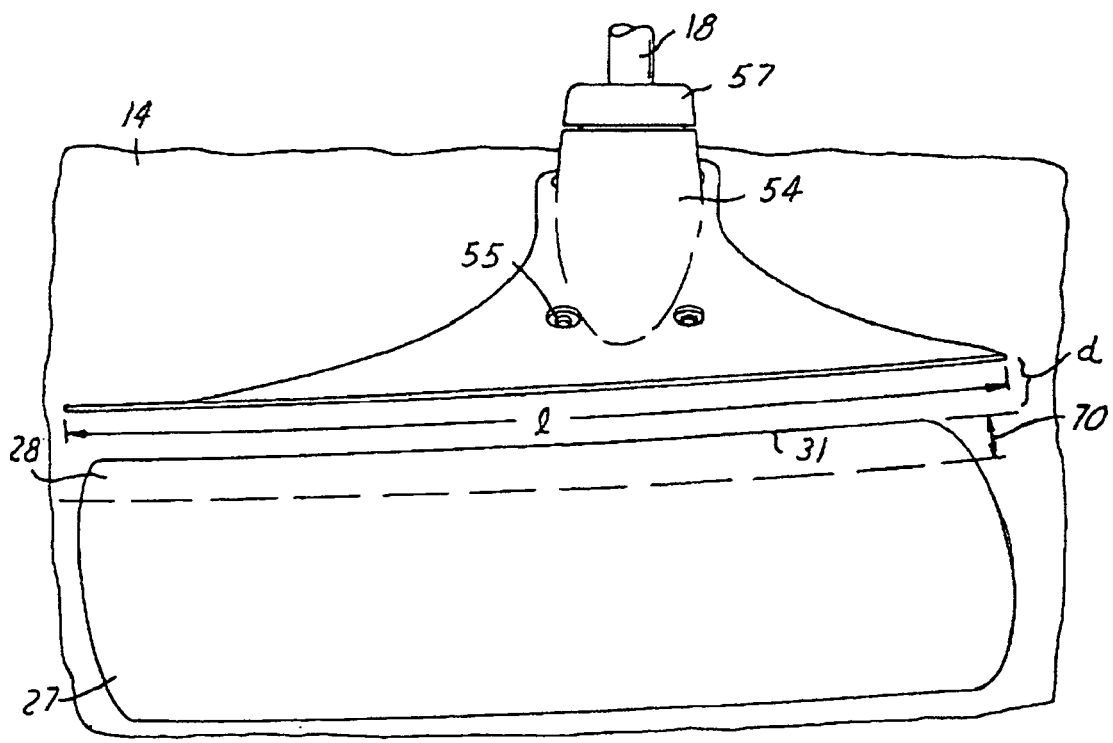
FIG. 5 is a side perspective view of FIG. 4.
Figure 6:
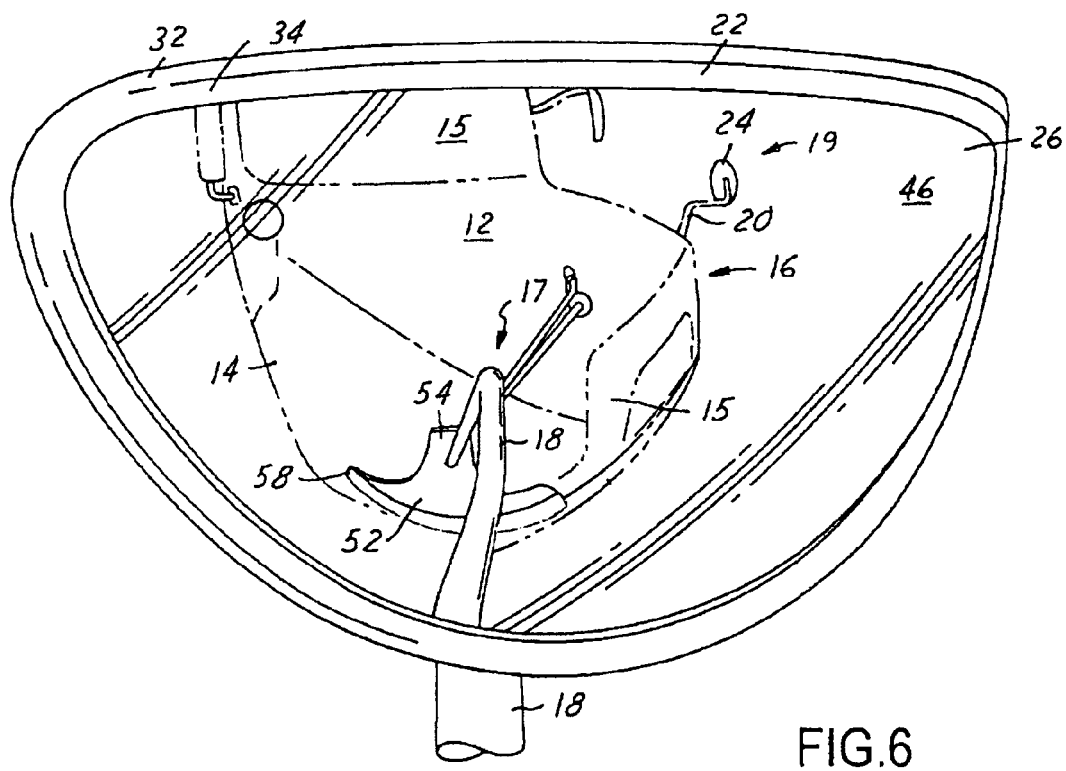
FIG. 6 is a perspective view of the cross view mirror subassembly of FIG. 3 in which the cross view mirror combination mirror mount and headlight visor is visible to the vehicle operator as viewed through the reflective surface of the cross view mirror assembly

As shown in FIG. 5, the length l of the flared outer region 58 runs parallel to the length of the headlight 27 and extends along the entire length of the headlight 27 so as to "cover" lengthwise the visible portion (i.e. portion 28) of the headlight 27 visible to the vehicle operator through the reflective surface of the corresponding cross view mirror subassembly 46. Further, the width w of the flared outer region 58 is sufficiently wide so as to "cover" widthwise the visible portion (i.e. portion 28) of the headlight 27 visible to the vehicle operator through the reflective surface of the corresponding cross view mirror subassembly 46. The widthwise-visible portion corresponds to the depth 70 that the portion 28 of the headlight 27 extends onto the respective fender 14, 16 away from the plane defined by the front grill 12. Thus, headlight glare to the operator from the headlight 27, as viewed through the reflecting surface 46, is minimized or eliminated.

As one of ordinary skill in the art appreciates, the combination mirror mount and headlight visor 52 may take on many shapes and sizes depending upon numerous factors, including the manufacture of the school bus and potential changing safety requirements for headlights 27 on school buses. Thus, for example, the shape of the flared outer region 58 is custom shaped to substantially "cover" the shape of the headlights 27 as viewed through the reflective surface 46.

Further, the width w of the flared outer region 58 is contingent upon the distance d between the flared outer region 58 and the portion 28 of the headlight 27. For the purposes of the present invention, the width w is defined as the distance between the outermost portion 60 of the flared outer region 58 and a point 62 on the respective fender 14, 16 in a direction running substantially parallel with a plane p defining the top portion 31 of the headlight 27. By simple geometry, as this distance d between the point 62 and the top portion 31 of the headlight 27 increases, the width w required to substantially "cover" the shape of the headlight 27 (and thus eliminate headlight glare to the vehicle operator), as viewed through the reflective surface 46, correspondingly decreases. Thus, for a flared outer region 58 having a predetermined width, a theoretical minimum distance may be determined for mounting the combination mirror mount and headlight visor 52 to the respective fender 14, 16 such that the entire width of the headlight is covered by the width w of the flared outer region 58. A similar computation can determined corresponding to the length of the flared outward region 58.

While the flared outer region 58, as shown in FIGS. 3–6, extends generally parallel to a plane p defining the top portion 31 of the headlight 27, it is specifically contemplated, in alternative embodiments, that the flared outer region 58 may slope downwardly slightly towards the top portion 31 of the headlight 27. In this arrangement, the width w of the flared outer region 58 required to substantially "cover" the headlight as viewed by the vehicle operator from the reflective surface 46 decreases.

Figure 7:
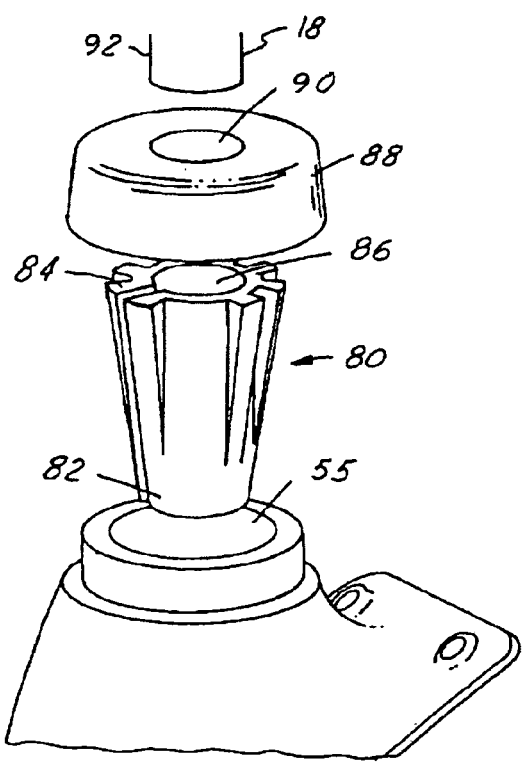
FIG. 7 is an exploded view of the coupling of the mounting arrangement of the cross view mirror to the fender utilizing the combination mirror mount and headlight visor of FIG. 3.
Figure 8:
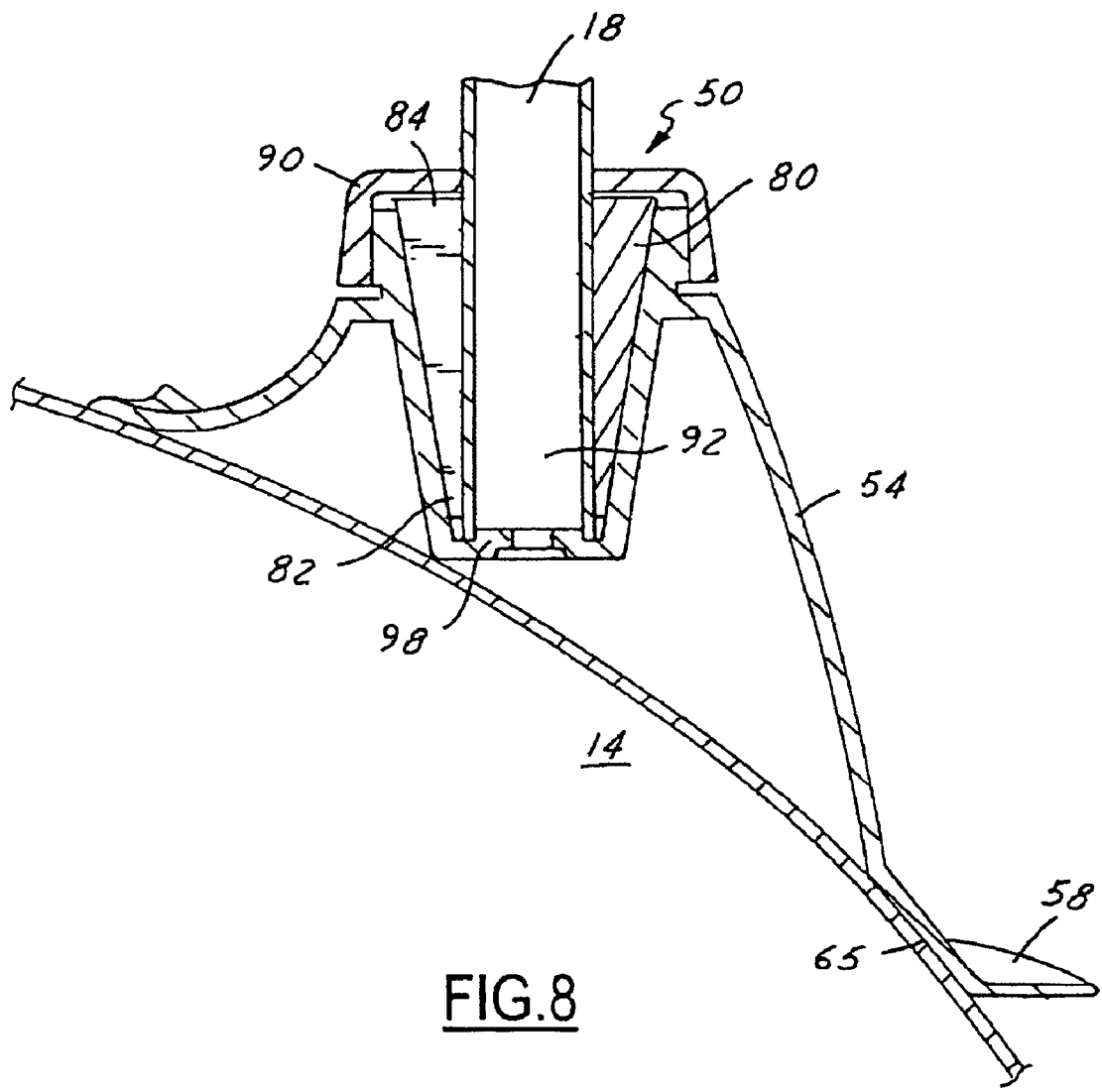
FIG. 8 is a section view of the mounting arrangement of the cross view mirror to the fender utilizing the combination mirror mount and headlight visor of FIG. 3 taken along line 8—8.

Referring now to FIGS. 7 and 8, one preferred method for mounting the support 18, 20 within the combination mirror mount and headlight visor 52 and coupling the visor 52 to the respective fender 14, 16 is illustrated. A conical compression spacer 80 having a narrow bottom region 82 and a larger top region 84 is loosely placed within the mounting hole 55 of the visor. The narrow bottom region 82 has a smaller circumference than the mounting hole 55, while the larger top region has a larger circumference than the mounting hole 55. The spacer 80 has an interior region 86 having that is shaped to substantially match the shape of the circumference of the mounting support 18, 20. A cap 88 having a hole 90 is placed onto the top region 84 of the spacer 80. The bottom portion 92 of the mounting support 18, 20 is introduced through hole 90 and within the interior region 86 of the spacer 80.

After the bottom portion is placed within the interior region 86 and abut the bottom 98 of the mounting hole 55, as best shown in FIG. 8, the cap 88 is then compression fit to the top region 84 within the interior of the mounting hole 55. The compressing of the top region 84 compresses a corresponding top region 84 of the interior region 86 around the bottom portion 92 of the mounting support 18, 20, therein affixing the mounting support 18, 20 within the mounting hole 55.

As one of ordinary skill in the art recognizes, the preferred embodiment described in FIGS. 7 and 8 for affixing the mounting support 18, 20 to the mounting hole 55 represents one of potentially infinite variations and is not intended to be limiting.

In other alternative embodiments, the desired mounting arrangement of the cross view mirror 17, 19 to the fender 14, 16, including the shape and configuration of the central mounting region 54, may vary greatly and remain within the spirit of the present invention. For example, the number of mounting holes 55 may vary depending upon the size of the vehicle (and length of the supports 18, 20), the composition and thickness of the central mounting region 54, the composition and thickness of the fenders 14, 16, and any other factor a person of ordinary skill would recognize.

In yet another preferred embodiment, the combination mirror mount and headlight visor 52 is integrally formed with said respective mirror mount 18, 20 and is thus a portion of the cross view mirror assembly 17, 19.

The present invention addresses the headlight glare issue by reducing headlight glare to the driver without changing the mirror height or mounting locations. The combination mirror mount and headlight glare visor maintains the field of vision requirements of FMVSS 111 and maintains the conventional mounting aspects of previous designs.

While the invention has been described in terms of preferred embodiments, it will be understood, of course, that the invention is not limited thereto since modifications may be made by those skilled in the art, particularly in light of the foregoing teachings. For example, while the embodiments shown in FIGS. 1–8 illustrate a cross view mirror, it is understood that the combination mirror mount and headlight visors could be used with spot mirror assemblies. Further, while the embodiments shown herein are used on a school bus 10, the invention may be used on other motor vehicles, including specifically on trucks.

What is claimed is:

1. A school bus or truck having reduced headlight glare to a vehicle operator comprising:
   a hood;
   a front grill section coupled to said hood;
   a pair of fenders coupled to said hood and to said front grill;
   a pair of headlights coupled within said front grill, wherein a portion of one of said pair of headlights is wrapped over one of said pair of fenders and a portion of an other of said pair of headlights is wrapped over an other of said pair of fenders;
   a cross view mirror assembly coupled to said one of said pair of fenders, said cross view mirror having a reflective surface;
   a combination mirror mount and headlight visor coupled to said cross view mirror assembly and used for mounting said cross view mirror assembly to one of said pair of fenders at a position near said portion of said headlight, said combination mirror mount and headlight visor positioned to substantially cover said portion of said one headlight as viewed by said vehicle operator through said reflective surface.

2. The school bus or truck of claim 1, wherein said mirror mount comprises:
   a central mounting region; and
   a flared outer region coupled to said central mounting region and positioned near said portion of said headlight, said flared outer region substantially covering said portion as viewed by said vehicle operator through said reflective surface.

3. The school bus or truck of claim 2, wherein said flared outer region has a length substantially covering the length of said portion of said one of said pair of headlights as viewed by said vehicle operator through said reflective surface.

4. The school bus or truck of claim 2, wherein said flared outer region has a width substantially covering a depth of said portion of said one of said pair of headlights as viewed by said vehicle operator through said reflective surface, said depth defined as the distance said portion of said one of said pair of headlights extends away from a plane defined by said front grill.

5. The school bus or truck of claim 2, wherein said flared outer region has a length substantially covering the length of said portion of said one of said pair of headlights as viewed by said vehicle operator through said reflective surface; and wherein said flared outer region has a width substantially covering a depth of said portion of said one of said pair of headlights as viewed by said vehicle operator through said reflective surface, said depth defined as the distance said portion of said one of said pair of headlights extends away from a plane defined by said front grill.

6. The school bus or truck of claim 2, wherein said central mounting region has support mounting region for coupling said cross view mirror assembly to said combination mirror mount and headlight visor.

7. The school bus or truck of claim 2, wherein said central mounting region is shaped to substantially conform to a top surface of said one of said pair of fenders.

8. The school bus or truck of claim 2, wherein said central mounting region further comprising:
   a second cross view mirror assembly coupled to said other of said pair of fenders, said cross view mirror having a reflective surface;
   a second combination mirror mount and headlight visor coupled to said second cross view mirror assembly and used for mounting said second cross view mirror assembly to said other of said pair of fenders at a position near said portion of said other of said pair of headlights, said second combination mirror mount and headlight visor positioned to substantially cover said portion of said other of said pair of headlights as viewed by said vehicle operator through said reflective surface of said second cross view mirror assembly.

9. The school bus or truck of claim 8, wherein said second combination mirror mount and headlight visor is integrally formed with said second cross view mirror assembly.

10. The school bus or truck of claim 2, wherein said flared outer region slopes outwardly away from said fender and towards said portion of said one of said pair of headlights.

11. The school bus or truck of claim 1, wherein said combination mirror mount and headlight visor is integrally formed with said cross view mirror assembly.

12. A method for reducing or minimizing headlight glare to a vehicle operator through a cross view mirror assembly having a reflective surface, the method comprising:
   providing a vehicle having a pair of headlights coupled to a front grill, a portion of each of said pair of headlights wrapping over a portion of a respective one of a pair of fenders, said portion having a predetermined width and a predetermined depth, said depth being the distance said portion extends away from a plane defined by said front grill, said vehicle being selected from a school bus and a truck;
   forming a combination mirror mount and headlight visor having a central mounting region and a flared outer region;
   coupling said combination mirror mount and headlight visor to the cross view mirror assembly;
   mounting said central mounting region to said respective one of said pair of fenders such that said flared outer region substantially covers said predetermined width and said predetermined depth of said portion of one of said pair of headlights as viewed by the vehicle operator through the reflective surface.

13. The method of claim 12 further comprising:
   determining a width of said flared outer region, said width is defined as the distance between an outermost portion of the flared outer region and a point on said respective fender in a direction running substantially parallel with a plane defining a top portion of said headlight;
   determining a minimum distance between said point and said top portion of said headlight as a function of said width, said minimum distance representing the minimum distance in which said flared outer region substantially covers said depth of said portion as viewed through said reflective surface; and
   mounting said combination mirror mount and headlight visor to said fender such that said point is equal to or farther than said minimum distance.

14. The method of claim 12, wherein said combination mirror mount and headlight visor is integrally formed with said cross view mirror assembly.

15. The method of claim 12, wherein forming a combination mirror mount and headlight visor comprises:
   determining a mounting location for a cross view mirror assembly;
   measuring a distance between said mounting location and a top portion of said headlight;
   measuring a depth of said headlight extending onto said fender, said depth corresponding to the distance between a top portion of said headlight and a plane extending along said front grill; and
   forming a combination mirror mount and headlight visor having a central mounting region and a flared outer region, said flared outer region having a sufficient width and a sufficient length to substantially cover said depth of said portion as viewed through said reflective surface when said combination mirror mount and headlight visor is mounted at said mounting location, said sufficient depth and said sufficient length being a function of said distance.

16. The method of claim 12 further comprising:
   forming a second combination mirror mount and headlight visor having a central mounting region and a flared outer region;
   coupling said second combination mirror mount and headlight visor to a second cross view mirror assembly;
   mounting said central mounting region of said second combination mirror mount and headlight visor to said respective other one of said pair of fenders such that said flared outer region substantially covers said predetermined width and said predetermined depth of said portion of other one of said pair of headlights as viewed by the vehicle operator through the reflective surface of said second cross view mirror assembly.

17. The method of claim 12, wherein coupling said combination mirror mount and headlight visor to the cross view mirror assembly comprises coupling a support of the cross view mirror assembly within a support mount region of said combination mirror mount and headlight visor.

18. The method of claim 12, wherein mounting said central mounting region to said respective one of said pair of fenders comprises:
   coupling a bottom portion of said central mounting region to said respective fender;
   attaching said central mounting region to said fender such that said flared outer region substantially covers said predetermined width and said predetermined depth of said portion of one of said pair of headlights as viewed by the vehicle operator through the reflective surface.

19. The method of claim 18, wherein attaching said central mounting region to said fender comprises introducing and securing a conventional coupling device within each of a plurality of mounting holes formed on said central mounting region.

20. The method of claim 19, wherein each of said conventional coupling devices is selected from the group consisting of bolts, screws, and rivets.

21. A combination mirror mount and headlight visor for mounting a cross view mirror assembly or a spot mirror assembly each having a reflective surface to a vehicle, the vehicle being a school bus or a truck, the combination mirror mount and headlight visor comprising:
   a central mounting region; and
   a flared outer region coupled to said central mounting region, said flared outer region substantially covering a headlight of the school bus as viewed by a vehicle operator through the reflective surface.

22. The combination mirror mount and headlight visor of claim 21, wherein said flared outer region has a length substantially covering the length of the headlight as viewed by said vehicle operator through the reflective surface.

23. The combination mirror mount and headlight visor of claim 21, wherein said flared outer region has a width substantially covering a depth of a portion of the headlight as viewed by a vehicle operator through the reflective surface.

24. The combination mirror mount and headlight visor of claim 21, wherein said flared outer region has a length substantially covering the length of the headlight as viewed by said vehicle operator through the reflective surface; and wherein said flared outer region has a width substantially covering a depth of a portion of the headlight as viewed by a vehicle operator through the reflective surface.

25. The combination mirror mount and headlight visor of claim 21, wherein said central mounting region has support mounting region for coupling the cross view mirror assembly or spot mirror assembly to said combination mirror mount and headlight visor.

26. The combination mirror mount and headlight visor of claim 25, wherein said support mounting region has a mounting hole sized to accommodate a mounting support of the cross view mirror assembly or of the spot mirror assembly.

27. The combination mirror mount and headlight visor of claim 21, wherein said central mounting region has a bottom region that is shaped to substantially conform to a top surface of a fender contained on the vehicle.

* * * * *